(12) United States Patent
Byun et al.

(10) Patent No.: US 10,420,138 B2
(45) Date of Patent: Sep. 17, 2019

(54) METHOD AND APPARATUS FOR PERFORMING COMMUNICATION IN WIRELESS COMMUNICATION SYSTEM

(71) Applicant: LG ELECTRONICS INC., Seoul (KR)

(72) Inventors: Ilmu Byun, Seoul (KR); Joonkui Ahn, Seoul (KR); Kijun Kim, Seoul (KR); Heejeong Cho, Seoul (KR); Genebeck Hahn, Seoul (KR); Eunjong Lee, Seoul (KR); Hyangsun You, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/741,707

(22) PCT Filed: Dec. 15, 2015

(86) PCT No.: PCT/KR2015/013767
§ 371 (c)(1),
(2) Date: Jan. 3, 2018

(87) PCT Pub. No.: WO2017/018618
PCT Pub. Date: Feb. 2, 2017

(65) Prior Publication Data
US 2018/0206266 A1  Jul. 19, 2018

Related U.S. Application Data

(60) Provisional application No. 62/196,308, filed on Jul. 24, 2015.

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0044* (2013.01); *H04L 5/0053* (2013.01);
(Continued)

(58) Field of Classification Search
CPC ..... H04W 72/12; H04W 72/04; H04W 72/14; H04L 5/00
See application file for complete search history.

(56) References Cited

U.S. PATENT DOCUMENTS

2011/0149780 A1* 6/2011 Bollea .................. H04B 7/0617
370/252
2012/0327761 A1* 12/2012 Obuchi ................. H04L 1/1819
370/216
(Continued)

FOREIGN PATENT DOCUMENTS

WO    2013/009145 A2    1/2013
WO    2014/124164 A1    8/2014

OTHER PUBLICATIONS

Huawei et al., "Motivation of New SI Proposal Latency Reduction", RP-150238, 3GPP TSG RAN Meeting #67, Shanghai, China, Mar. 9-12, 2015, pp. 1-12.
(Continued)

*Primary Examiner* — Chi Ho A Lee
(74) *Attorney, Agent, or Firm* — Dentons US LLP

(57) ABSTRACT

Provided are a method and an apparatus for performing communication in a wireless communication system. Specifically, a control channel element is configured by using a resource element group in the same symbol of a resource block. The resource element group includes a plurality of resource elements in the same symbol. The resource block is transmitted in units of sTTIs which is set to be shorter than TTI. A control channel corresponding to the control channel element, and a data channel scheduled by the control channel are configured. The control channel and the data channel
(Continued)

are transmitted in different frequency bands. Data is transmitted through the data channel.

13 Claims, 30 Drawing Sheets

(51) Int. Cl.
*H04W 72/04* (2009.01)
*H04W 72/14* (2009.01)

(52) U.S. Cl.
CPC ... *H04W 72/0406* (2013.01); *H04W 72/0446* (2013.01); *H04W 72/14* (2013.01); *H04L 5/005* (2013.01); *H04L 5/0007* (2013.01); *H04L 5/0051* (2013.01); *H04W 72/1278* (2013.01)

(56) References Cited

U.S. PATENT DOCUMENTS

| | | |
|---|---|---|
| 2014/0226607 A1 | 8/2014 | Holma et al. |
| 2016/0143030 A1* | 5/2016 | Lee .......................... H04L 5/00 370/329 |
| 2016/0150532 A1* | 5/2016 | Bhushan ................ H04L 1/1812 370/336 |
| 2016/0270059 A1* | 9/2016 | Chen ..................... H04L 5/0051 |
| 2016/0295584 A1* | 10/2016 | Chen ................. H04W 72/0446 |
| 2016/0338046 A1* | 11/2016 | Chen ..................... H04L 5/0048 |
| 2016/0352481 A1* | 12/2016 | Jiang ..................... H04L 5/0048 |
| 2017/0290008 A1* | 10/2017 | Tooher .................. H04L 1/0007 |
| 2018/0103504 A1* | 4/2018 | Quan ..................... H04W 52/02 |
| 2018/0109353 A1* | 4/2018 | Kwak ................... H04L 5/0044 |
| 2018/0359752 A1* | 12/2018 | Au ....................... H04W 72/042 |

OTHER PUBLICATIONS

Ericsson, "Motivation for new proposed SI: Study on Latency Reduction Techniques for LTE", RP-150310, 3GPP TSG RAN Meeting #67, Shanghai, China, Mar. 3, 2015, pp. 1-16.

* cited by examiner

| | | sTTI | | | sTTI | | | sTTI | | | sTTI | | |
|---|---|---|---|---|---|---|---|---|---|---|---|---|---|
| | | 0 | 4 | 8 | 0 | 4 | 8 | 0 | 4 | 8 | 0 | 4 | 8 |
| | | 1 | 5 | 9 | 1 | 5 | 9 | 1 | 5 | 9 | 1 | 5 | 9 |
| $R_1$ | $R_3$ | 2 | 6 | 10 | 2 | 6 | 10 | 2 | 6 | 10 | 2 | 6 | 10 |
| | | 3 | 7 | 11 | 3 | 7 | 11 | 3 | 7 | 11 | 3 | 7 | 11 |
| | | 0 | 4 | 8 | 0 | 4 | 8 | 0 | 4 | 8 | 0 | 4 | 8 |
| $R_0$ | $R_2$ | 1 | 5 | 9 | 1 | 5 | 9 | 1 | 5 | 9 | 1 | 5 | 9 |
| | | 2 | 6 | 10 | 2 | 6 | 10 | 2 | 6 | 10 | 2 | 6 | 10 |
| | | 3 | 7 | 11 | 3 | 7 | 11 | 3 | 7 | 11 | 3 | 7 | 11 |
| $R_1$ | $R_3$ | 0 | 4 | 8 | 0 | 4 | 8 | 0 | 4 | 8 | 0 | 4 | 8 |
| | | 1 | 5 | 9 | 1 | 5 | 9 | 1 | 5 | 9 | 1 | 5 | 9 |
| | | 2 | 6 | 10 | 2 | 6 | 10 | 2 | 6 | 10 | 2 | 6 | 10 |
| $R_0$ | $R_2$ | 3 | 7 | 11 | 3 | 7 | 11 | 3 | 7 | 11 | 3 | 7 | 11 | sRB

FIG. 13

| | | sTTI | | sTTI | | sTTI | | sTTI | | sTTI | | sTTI | |
|---|---|---|---|---|---|---|---|---|---|---|---|---|---|
| | | 0 | 4 | 0 | 4 | 0 | 4 | 0 | 4 | 0 | 4 | 0 | 4 |
| | | 1 | 5 | 1 | 5 | 1 | 5 | 1 | 5 | 1 | 5 | 1 | 5 |
| R1 | R3 | 2 | 6 | 2 | 6 | 2 | 6 | 2 | 6 | 2 | 6 | 2 | 6 |
| | | 3 | 7 | 3 | 7 | 3 | 7 | 3 | 7 | 3 | 7 | 3 | 7 |
| | | 0 | 4 | 0 | 4 | 0 | 4 | 0 | 4 | 0 | 4 | 0 | 4 |
| R0 | R2 | 1 | 5 | 1 | 5 | 1 | 5 | 1 | 5 | 1 | 5 | 1 | 5 |
| | | 2 | 6 | 2 | 6 | 2 | 6 | 2 | 6 | 2 | 6 | 2 | 6 |
| | | 3 | 7 | 3 | 7 | 3 | 7 | 3 | 7 | 3 | 7 | 3 | 7 |
| R1 | R3 | 0 | 4 | 0 | 4 | 0 | 4 | 0 | 4 | 0 | 4 | 0 | 4 |
| | | 1 | 5 | 1 | 5 | 1 | 5 | 1 | 5 | 1 | 5 | 1 | 5 |
| | | 2 | 6 | 2 | 6 | 2 | 6 | 2 | 6 | 2 | 6 | 2 | 6 |
| R0 | R2 | 3 | 7 | 3 | 7 | 3 | 7 | 3 | 7 | 3 | 7 | 3 | 7 | sRB

FIG. 17

| 1 | 3 | 2 |
|---|---|---|
| 3 | 2 | 1 |
| 2 | 1 | 3 |
| 1 | 3 | 2 |

FIG. 18

| 1 | 3 | 2 |
|---|---|---|
| 3 | 2 | 1 |
| 2 | 1 | 3 |
| 1 | 3 | 2 |

FIG. 20

| 1 | 3 | 2 |
|---|---|---|
| 1 | 2 | 3 |
| 1 | 3 | 2 |
| 1 | 2 | 3 |

METHOD AND APPARATUS FOR PERFORMING COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2015/013767, filed on Dec. 15, 2015, which claims the benefit of U.S. Provisional Application No. 62/196,308 filed on Jul. 24, 2015, the contents of which are all hereby incorporated by reference herein in their entirety.

BACKGROUND OF THE INVENTION

Field of the Invention

The present specification relates to wireless communication, and more particularly, to a method of performing communication in a wireless communication system, and a device using the method.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane. That is, a TTI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

The present specification provides a method of performing communication in a wireless communication system, and a device using the method.

The present specification proposes a method of performing communication by using a plurality of control channels and data channels transmitted by a plurality of symbols in a wireless communication system.

First, terminologies are summarized. A subframe may be transmitted in unit of a transmission time interval (TTI), and a resource block may be transmitted in unit of a short TTI (sTTI) which is set to be temporally shorter than the TTI. Therefore, the resource block may be a short RB (sRB), and a resource element group may be a short REG (sREG). The resource element group includes a plurality of resource elements. A data channel includes a short PDSCH (sPDSCH), and a control channel includes a short PDCCH (sPDCCH) for the sPDSCH. Therefore, a plurality of control channels and data channels transmitted in unit of the sTTI are present in the subframe transmitted in unit of the TTI. A symbol includes an OFDM symbol.

A control channel element is configured by using a resource element group in the same symbol of a resource block. That is, for sPDCCH transmission, the resource element group is mapped to the control channel element. One or a plurality of resource element groups may be used to configure the control channel element. Herein, the resource element group includes a resource element in the same symbol, and the control channel element is a short CCE (sCCE).

The resource element in the resource element group may be consecutively arranged on the same symbol. In this case, a CRS must be arranged in the resource element group to the minimum extent possible. This is because SFBC must be applicable even if a part of the resource element group is punctured due to the CRS.

In addition, the resource element in the resource element group may be arranged on the same symbol in a distributed manner. In this case, a DM-RS is arranged in the resource element group of the resource block.

The control channel element needs to be aggregated to transmit the control channel. The same symbol is referred to as a first symbol, and a second symbol is a symbol transmitted in the resource block after the first symbol. In this case, the control channel element is aggregated on the first symbol. If a resource of a control channel corresponding to the control channel element is insufficient when using only the aggregation on the first symbol, the control channel element may also be additionally aggregated on the second symbol. That is, the aggregation may be preferentially performed on the same symbol, and if an additional resource is necessary, may be performed even until on a next symbol.

If the aggregation is performed on the first symbol and the second symbol, a DL grant and a retransmission DL grant may be transmitted through a control channel corresponding to the control channel element aggregated on the first symbol. In addition, a UL grant and a retransmission UL grant may be transmitted through a control channel corresponding to the control channel element aggregated on the second symbol. For another example, the DL grant and the UL grant may be transmitted through the control channel corresponding to the control channel element aggregated on the first symbol. In addition, the retransmission DL grant and the retransmission UL grant may be transmitted through the control channel corresponding to the control channel element aggregated on the second symbol. This is for decreasing a latency effect caused by an increase in a decoding time of a sPDCCH to achieve a user plane latency of 1 ms.

Allocation information of the control channel corresponding to the control channel element aggregated on the first symbol or the second symbol may be commonly transmitted through SIB or may be individually transmitted through RRC. The allocation information of the control channel includes information indicating a size of a sRB for allocating the sPDCCH, information indicating a size of a sRBG of the sPDSCH, or location information of an RB capable of transmitting a sPDCCH of a specific UE. When it is said that information is commonly transmitted through SIB, it means that the information is transmitted to all low-latency UEs, and when it is said that the information is individually transmitted through RRC, it means that the information is transmitted through a specific low-latency UE.

The same symbol of the resource block is a first symbol of the resource block. Therefore, the first symbol may be the first symbol of the resource block, and the second symbol may be a second symbol of the resource block.

One or a plurality of resource blocks may be provided. When the plurality of resource blocks are transmitted during the sTTI, each resource block may be transmitted in a frequency-distributed manner. In addition, a control channel element may be configured and aggregated by using a resource element group of the plurality of resource blocks.

A control channel corresponding to the previously configured control channel element is configured, and a data channel scheduled by the control channel is configured. In this case, the control channel and the data channel are transmitted in different frequency bands. That is, a sPDCCH and a sPDSCH are allocated in an FDM manner during the sTTI.

Data is transmitted through the data channel.

In addition, the present specification proposes a method of performing communication by using a plurality of control channels and data channels transmitted by a plurality of symbols in a wireless communication system.

First, terminologies are summarized. A subframe may be transmitted in unit of a transmission time interval (TTI), and a resource block may be transmitted in unit of a short TTI (sTTI) which is set to be temporally shorter than the TTI. Therefore, the resource block may be a short RB (sRB), and a resource element group may be a short REG (sREG). The resource element group includes a plurality of resource elements. A data channel includes a short PDSCH (sPDSCH), and a control channel includes a short PDCCH (sPDCCH) for the sPDSCH. Therefore, a plurality of control channels and data channels transmitted in unit of the sTTI are present in the subframe transmitted in unit of the TTI. A symbol includes an OFDM symbol.

A wireless device includes a radio frequency (RF) unit transmitting and receiving a radio signal, and a processor operatively coupled to the RF unit. The processor configures a control channel element by using a resource element group in the same symbol of a resource block. That is, for sPDCCH transmission, the resource element group is mapped to the control channel element. A control channel corresponding to the previously configured control channel element is configured, and a data channel scheduled by the control channel is configured. In this case, the control channel and the data channel are transmitted in different frequency bands. That is, a sPDCCH and a sPDSCH are allocated in an FDM manner during the sTTI. Data is transmitted through the data channel.

According to the proposed method, an increase in a decoding time of a sPDCCH can be minimized when using an FDM scheme, while minimizing the number of RBs for transmitting the sPDCCH.

BRIEF DESCRIPTION OF THE DRAWINGS

FIG. 10 shows an example of a sREG arrangement in a sTTI structure having 3 OFDM symbols.

FIG. 11 shows an example of a sREG arrangement in a sTTI structure having 2 OFDM symbols.

FIG. 12 shows an example of arranging a sREG in a sTTI structure to which a DM-RS is applied and which has 3 OFDM symbols.

FIG. 13 shows an example of arranging a sREG in a sTTI structure to which a DM-RS is applied and which has 2 OFDM symbols.

FIG. 17 to FIG. 28 show an embodiment of performing a sCCE aggregation in a sTTI structure having 3 OFDM symbols.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
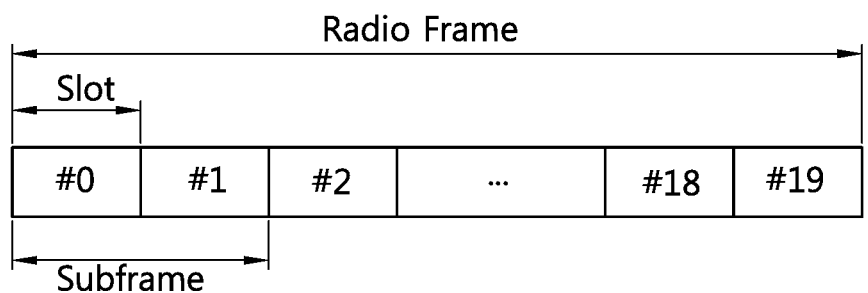
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
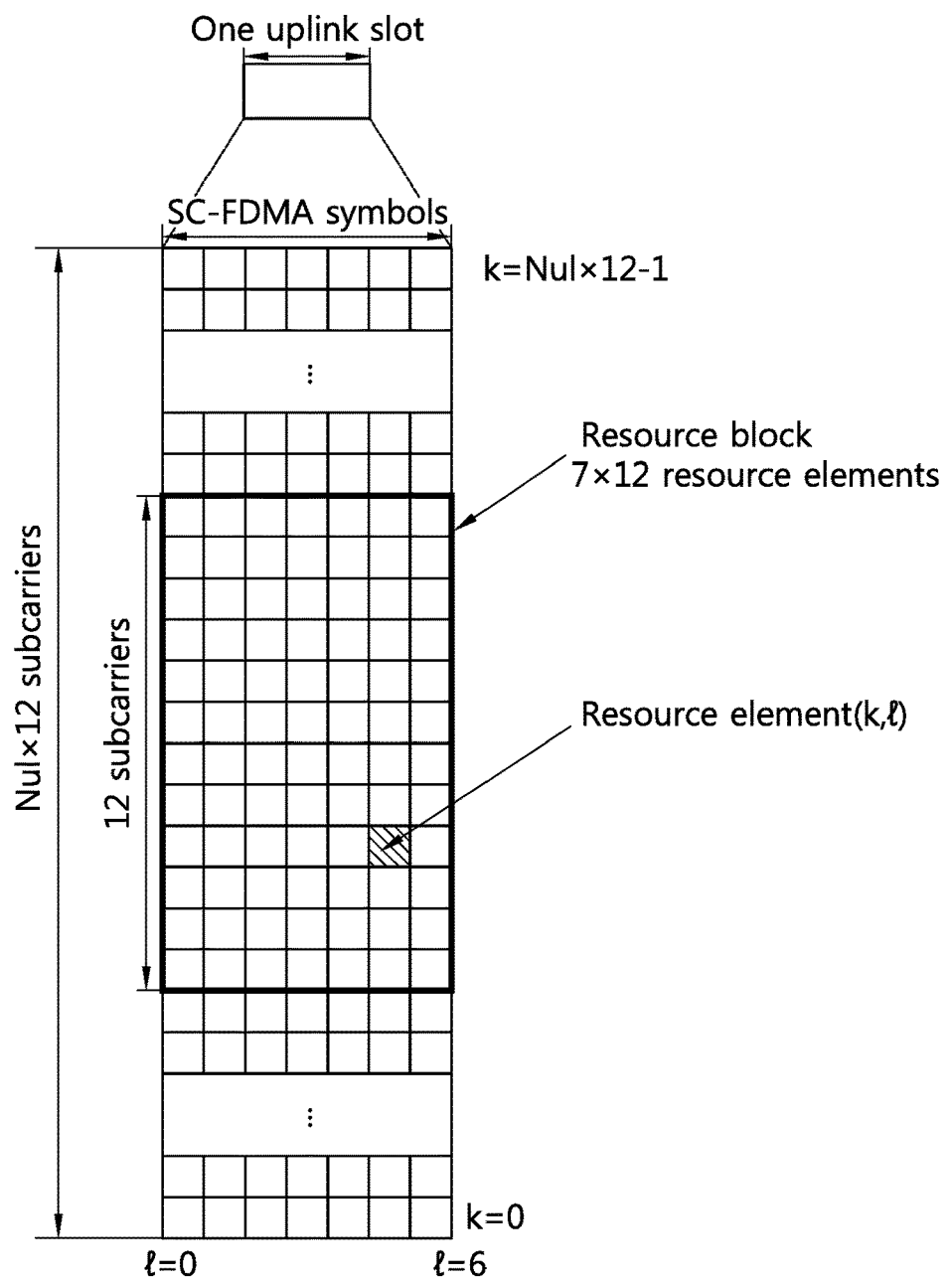
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, ..., $N^{UL}$×12−1) denotes a subcarrier index in the frequency domain, and l(l=0, ..., 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
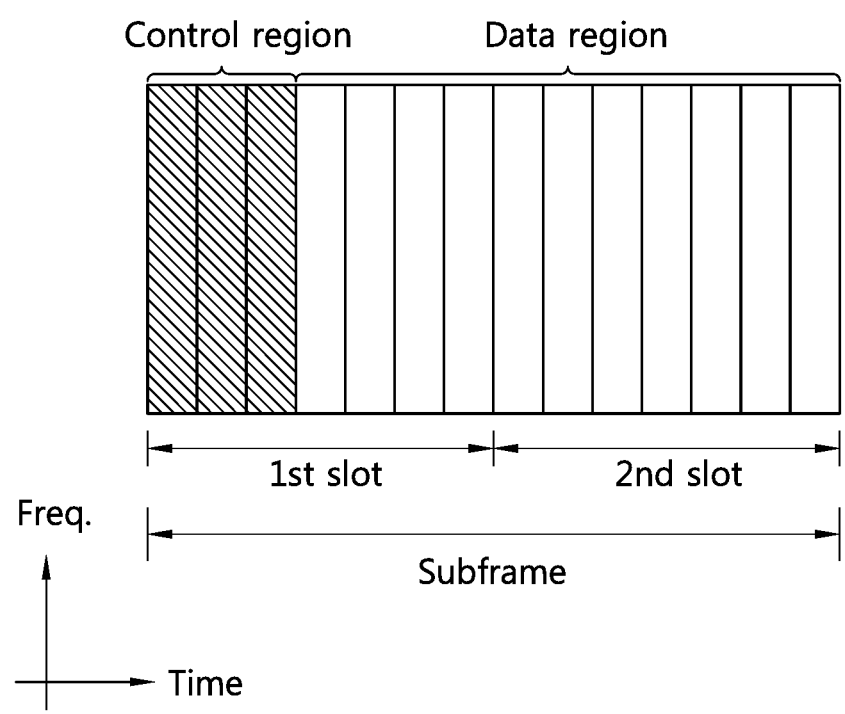
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Hereinafter, a subframe consisting of N (>=1) OFDM symbols is defined, and a specific radio frame structure in which M (>=0) subframes and P (>=0) special symbols (s-symbols) for a control physical signal or a control information transport channel are bundled is described. This shows a specific radio frame structure designed differently from the example in which 14 contiguous OFDM symbols illustrated in FIG. 1 become one subframe and 10 subframes have one radio frame structure.

Data, a control physical signal, and control information may be transmitted in a subframe, and a control physical signal and control information other than data may be transmitted in a special symbol. Such a time section resource transmission structure may be designated in a UE unit or may be designated so that it is in common applied to all of pieces of UE in a cell or system. At the same time, a transmission structure may be limitedly designated so that it is applied depending on a time or frequency band (subband). If the time section resource transmission structure is designated in a UE unit, UE may be notified of such designation using a UE-specific downlink physical control channel or UE-specific RRC signaling. In the case of the UE-common designation of a BS or network, UE may be notified of the designation using a UE-common downlink physical control channel or UE-common RRC signaling as system information.

Figure 4:
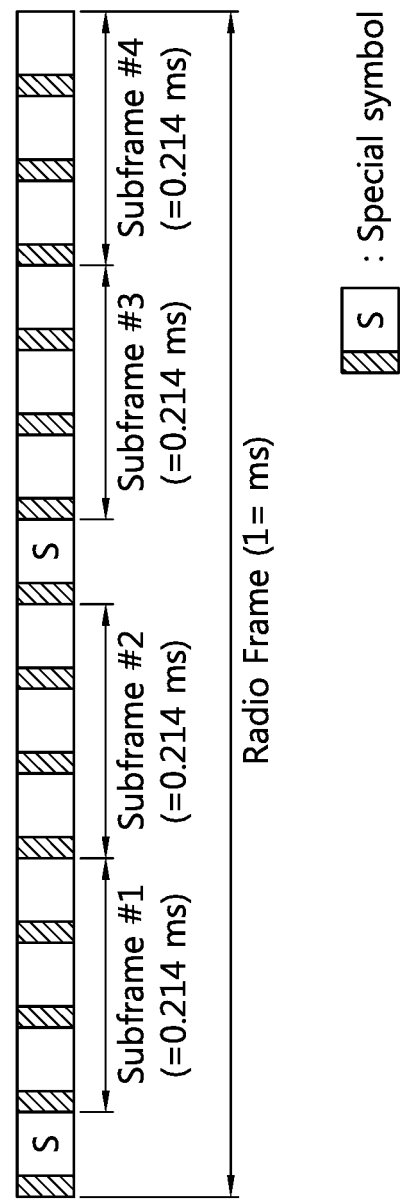
FIG. 4 shows the structure of a radio frame including subframes and special symbols.

FIG. 4 shows the structure of a radio frame including subframes and special symbols.

FIG. 4 illustrates a time section transmission resource structure in which three OFDM symbols (N=3) form a single subframe and four subframes (M=4) and two special symbols (P=2) define a radio frame of 1 ms in length. The length of each subframe is 0.214 ms.

In this case, special symbols within the radio frame may be disposed at equal distances, may be disposed only at a specific location, or may be irregularly disposed. If the role of special symbols is for measurement, detection or the transfer of information, the special symbols may be disposed at equal distances. Special symbols may be irregularly disposed depending on the number of pieces of UE within a cell or a channel characteristic. Some examples in which a special symbol is disposed are described below.

Figure 5:
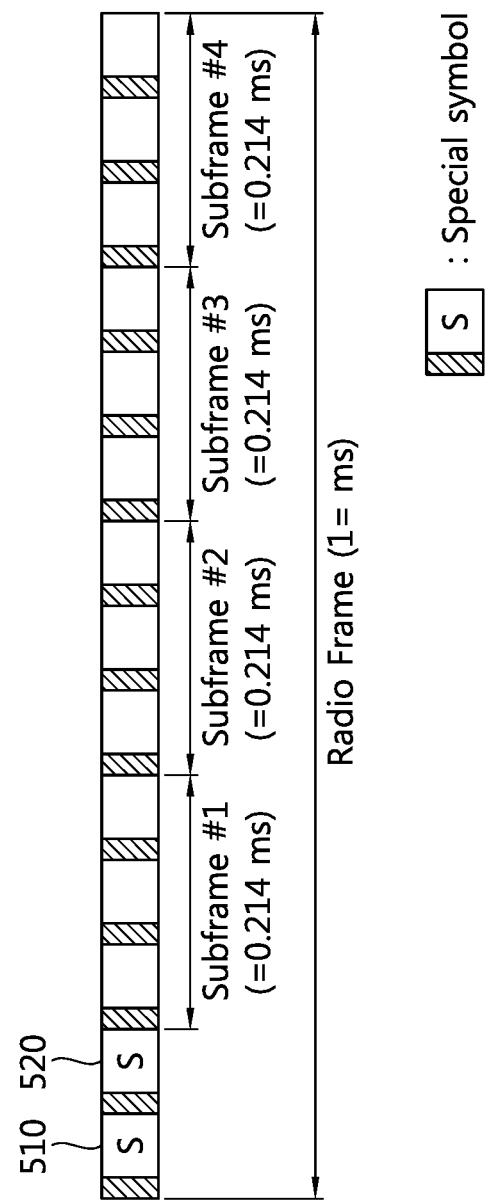
FIG. 5 shows an example of the structure of a radio frame in which special symbols have been contiguously disposed at the front part of the radio frame.
Figure 6:
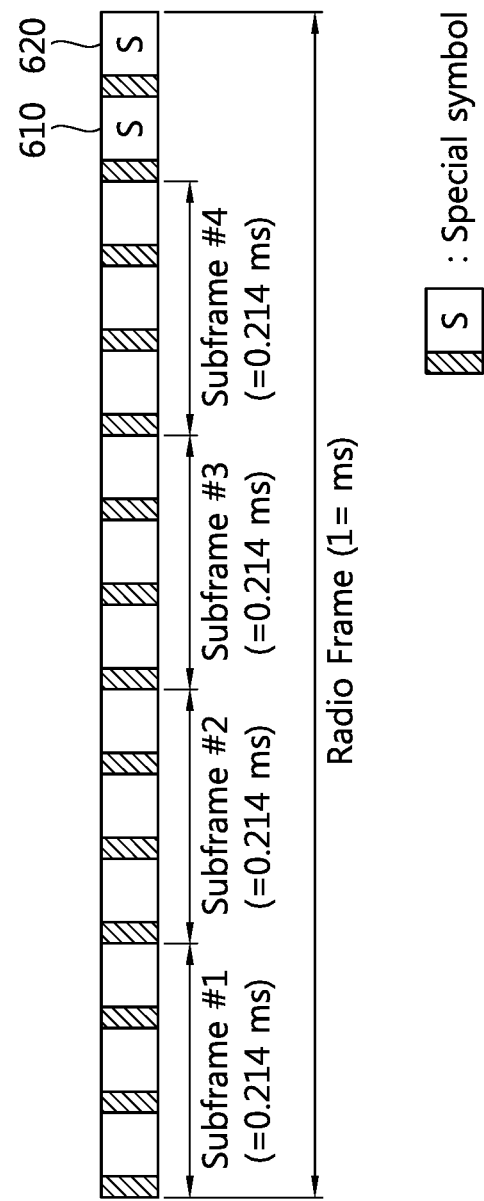
FIG. 6 shows an example of the structure of a radio frame in which special symbols have been contiguously disposed at the back part of the radio frame.

FIG. 5 shows an example of the structure of a radio frame in which special symbols have been contiguously disposed at the front part of the radio frame. FIG. 6 shows an example of the structure of a radio frame in which special symbols have been contiguously disposed at the back part of the radio frame. FIG. 5 shows a transmission resource structure in which special symbols 510 and 520 are contiguously disposed in symbols that are temporally the first two on the radio frame. FIG. 6 shows a transmission resource structure in which special symbols are contiguously disposed in symbols 610 and 620 that are temporally the last two on the radio frame.

In this specification, in the time section transmission resource structure, the locations of special symbols in each radio frame may be different in a radio frame unit or a plurality of radio frame units. If one or a plurality of special symbol is periodically disposed in a radio frame unit, the locations of special symbol in a corresponding cycle may be patterned, and an index may be assigned to the pattern. Alternatively, a BS may notify UE of control information about a bitmap form in a radio frame unit through RRC signaling, may transfer the control information to the UE through a downlink physical data channel using an MAC control element (CE), or may transfer the control information to the UE through a downlink physical control channel.

In this specification, the time section transmission resource structure is specified in a UE unit in frequency division duplex (FDD). Alternatively, the time section transmission resource structure may be applied to both a downlink transmission band and an uplink transmission band or only one of a downlink transmission band and an uplink transmission band with respect to all of pieces of UE within a cell.

Likewise, the time section transmission resource structure may be specified in a UE unit in time division duplex (TDD) or full duplex using specific radio resources for uplink/downlink transmission. Alternatively, the time section transmission resource structure may be applied to both downlink transmission time resources and uplink transmission time resources or only one of downlink transmission time resources and uplink transmission time resources with respect to all of pieces of UE within a cell. From a viewpoint of an uplink/downlink time section resource configuration of TDD, a method for designating downlink transmission resources and uplink transmission resources in a radio frame unit may be applied to the time section transmission resource structure. Alternatively, a method for designating downlink transmission resources and uplink transmission resources in a subframe unit within a radio frame may be applied to the time section transmission resource structure.

That is, in this specification, the time section transmission resource structure is provided on the basis that it may be independently applied to uplink/downlink transmission resources using parameters independently on a physical control channel or RRC signaling. Furthermore, if only a method for simultaneously applying uplink transmission and downlink transmission is used depending on a method for applying a system, the time section transmission resource structure may be applied in common simultaneously using a single parameter on a physical control channel or RRC signaling.

In this specification, the time section transmission resource structure defines a special symbol within a radio frame independently of a subframe. In this case, the special symbol may be used to transmit special cell-common or UE-specific control information. Furthermore, the special symbol may be used to transmit a special cell-common or UE-specific physical signal (e.g., a pilot, a reference signal or a synchronization signal) for the purpose of the measurement or detection of UE. Possible examples of a signal or control information that is transmitted in the special symbol are described below in the case of downlink and uplink.

1. Downlink (1) Transmission of Physical Downlink Control Channel (PDCCH)

A BS transmits a PDCCH, including UE-common control information or pieces of UE-specific control information required to be transmitted from the BS or a specific network radio node to UE through downlink, to the UE through a special symbol. The UE may receive a physical channel, that is, the object of the special symbol. In this case, the PDCCH is basically designed on a frequency resource on a single special symbol, but may be designed on a plurality of symbols resources and frequency resources if a plurality of special symbols is used.

(2) Transmission of Downlink Synchronization Signal

A BS may transmit a downlink synchronization physical signal transmitted so as to obtain the downlink reception synchronization of UE through one or more special symbols. For example, in 3GPP LTE, a primary synchronization signal (PSS) and a secondary synchronization signal (SSS) become the object of a downlink synchronization physical signal. If such a method is applied, the location of a special symbol used to the corresponding object within a specific defined radio frame on time section resources may be designated in a UE-common manner. Furthermore, a BS and UE permanently designate the location of a special symbol without separate signaling.

(3) Transmission of Downlink Channel Measurement Pilot (or Reference Signal)

For the purpose of system downlink control including the support of a determination of the time-frequency resource configuration and transmission method of a packet scheduler adaptive to a radio channel on a radio packet transmission system, a downlink channel measurement pilot is transmitted through one or more special symbols defined separately from a UE data channel transmission time section. Furthermore, UE performs radio channel measurement using a corresponding pilot through a corresponding special symbol. This method may be used as a method for preventing the deterioration of data transmission performance generated because resources for transmitting the existing data channel are excessively used to transmit a pilot signal if a technology in which downlink transmission is performed using a large number of transmission antennas, such as massive MIMO, is used in a mobile communication system. In this case, the massive MIMO may be defined as a transmission method using 16 or more transmission antennas. It is assumed that a downlink channel measurement pilot is transmitted using a plurality of special symbols. In this case, in addition to the multiplexing method of a multiple pilot resource pattern using a basic TDM, FDM method, the multiplexing method of a multiple pilot resource pattern using a CDM method through the application of time section orthogonal code or frequency section orthogonal code may be applied.

(4) Use of Interference Signal Measurement by UE

An operation of allowing UE to measure a downlink reception interference signal of another network radio node or UE other than a network radio node (or BS) that provides service through one or more special symbols may be defined. As a first example, a specific network radio node (or BS) excludes the transmission of a radio signal in all of subcarrier resources or some designated subcarrier resources included in a special symbol on time section transmission resources that are to be used for transmission by the specific network radio node (or BS). Furthermore, UE that is provided with service from a corresponding network radio node may use a method for receiving a specific signal (it may be defined as a pilot or reference signal) of adjacent network radio nodes (or BSs) through the corresponding symbol. In this case, a special symbol transmission signal on a plurality of network radio nodes may be defined as a pilot (or reference signal) for downlink channel measurement. Furthermore, in order to exclude the transmission of a radio signal, all of subcarrier resources within a specific pilot pattern or a corresponding symbol may be specially defined as a null power pilot. As a second example, an operation for the UE interference measurement of the first example may be applied in a situation in which a serving network radio node also transmits a signal by applying a specific resources pattern of a specific pilot (or reference signal) of a specific channel may also be applied.

(5) Transmission of Downlink ACK/NACK Signal for Uplink Data

A downlink ACK/NACK signal for transmitting uplink data is defined as a physical channel on a specific special symbol. A network radio node (or a BS) that receives the uplink data transmits the downlink ACK/NACK signal through the corresponding special symbol. A correction mechanism operation for detecting an error of a system physical layer may be defined so that UE that transmits the uplink data receives the downlink ACK/NACK signal through the corresponding special symbol.

(6) Transmission of Downlink Massive MIMO Beam Scanning Signal

In this specification, a radio network node (or a BS) adopting a time section transmission resource structure also applies a downlink transmission method of massive MIMO. In this case, an operation for transmitting, by a network radio node (or a BS), the transmission of a signature, pilot or reference signal for supporting the UE beam tracking of massive MIMO in a specific cycle through a special symbol and receiving, by UE, the signature, pilot or reference signal through a corresponding special symbol may be defined as applied.

2. Uplink (1) Transmission of an Uplink Synchronization Signal

A method for designing the uplink synchronization signal (e.g., a physical random access channel (PRACH) preamble in 3GPP LTE) of UE in the length of one or a plurality of special symbols and transmitting the uplink synchronization signal may be applied in a situation in which this time section transmission resource structure is applied as an uplink transmission frame structure.

(2) Transmission of Uplink Channel Sounding Signal

An uplink channel sounding signal of UE may be designated to be transmitted through a special symbol on the time section transmission resource structure. If a network radio node (or a BS) instructs the uplink channel sounding signal to be transmitted, a UE-specific uplink data transmission grant at a specific point of time prior to a corresponding special symbol by a designated length (it may be designated in a radio frame or subframe unit) may be triggered in a PDCCH using in a channel sounding transmission indicator. In some embodiments, a UE-specific uplink data transmission grant may be designated using an RRC parameter and signaled to UE when a periodical channel sounding signal is transmitted. In both the methods, a point of time at which the transmission of a UE-specific channel sounding signal is attempted and a resource configuration may be previously designated using an RRC parameter and signaled to UE.

(3) Transmission of Physical Uplink Control Channel (PUCCH)

In a situation in which the time section transmission resource structure is applied as an uplink transmission frame structure, a method for transmitting uplink control information of specific UE through a PUCCH designed on one or a plurality of special symbols may be applied. In this case, the uplink control information of UE may be defined as follows.

Uplink scheduling request information according to a change of the transmission buffer state of UE (data arrival)

Downlink channel measurement information of UE

ACK/NACK information for the reception of downlink data by UE

The type of uplink physical control channel transmitted through one or a plurality of special symbols may be designated by taking into consideration the requirement information about of the above-described uplink control information, that is, a bit size. The type basically includes the following two schemes.

Scheme #1: A method for defining one PUCCH supporting an error generation restriction condition that is required for each piece of information on a bit size of uplink control information of a wide range and being applied to control information cases in common.

Scheme #2: A method for defining an individual PUCCH(s) supporting a maximum size of control information bit and an error requirement condition of corresponding information for each piece of control information in the case where a difference between the bit size of individual uplink control information and a required error generation rate restriction condition is defined to be large and transmitting the individual PUCCH(s) through one or a plurality of special symbols.

(4) Utilization of Interference Signal Measurement by UE

An operation for allowing a network radio node (or a BS) to measure the uplink reception interference signal of another network radio node or UE through one or more special symbols may be defined. As a detailed example, a plurality of pieces of specific UE or a specific network radio node (or a BS) may be designated to transmit a special pilot (or reference signal or signature), that is, an object of interference measurement, using a special symbol. In this case, the specific radio network node (or the BS) may check a surrounding interference situation by receiving and detecting such signals. In this case, the transmission of a corresponding pilot through special symbols of pieces of UEs that are to be received by the specific network radio node (or the BS) through uplink may be excluded. Furthermore, for such a purpose, all of subcarrier resources within a specific pilot pattern or a corresponding symbol may be specially defined as a null power pilot.

A next generation wireless communication system aims to satisfy a user plane latency of 1 ms in order to provide a lower latency service. The user plane latency includes not only the existing TTI length but also an encoding time and a decoding time. The user plane latency in a 3GPP LTE system is about 4.8 ms (encoding time=decoding time=1.5 ms, the existing TTI length=1 ms, target BLER=10%).

In this case, if a sTTI reduced from the existing TTI has a length of 1 to 3 OFDM symbols, the user plane latency may be achieved as 1 ms. That is, in order to achieve the user plane latency of 1 ms, the sTTI must have a length less than or equal to 3 OFDM symbols. If the user plane latency is less than or equal to 1 ms, the existing TTI must be about 1/4.8=0.21 ms. However, ever since the sTTI has a length of 4 OFDM symbols, the user plane latency cannot be achieved as 1 ms. This is because the sTTI is greater than or equal to 0.28 ms ever since the number of OFDM symbols is 4. Herein, it is assumed that the encoding/decoding time is also decreased proportionally in association with a decreased TTI.

Figure 7:
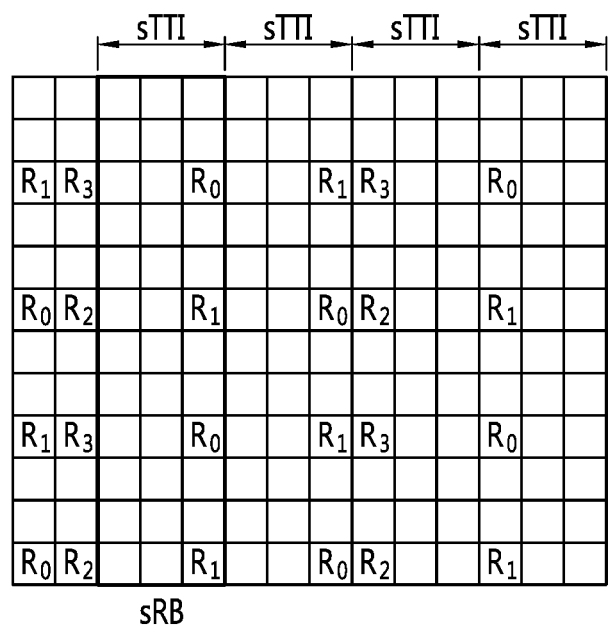
FIG. 7 shows an example of a sTTI structure having 3 OFDM symbols.

FIG. 7 shows an example of a sTTI structure having 3 OFDM symbols.

In FIG. 7, a short RB (sRB) consists of 12 subcarriers and 3 OFDM symbols in total. Although one sRB consists of 36 REs, 32 REs can transmit signals in practice except for a cell-specific reference signal (CRS). In addition, the number of REs capable of transmitting signals in a first symbol of the sTTI is 8 in the presence of the CRS.

Figure 8:
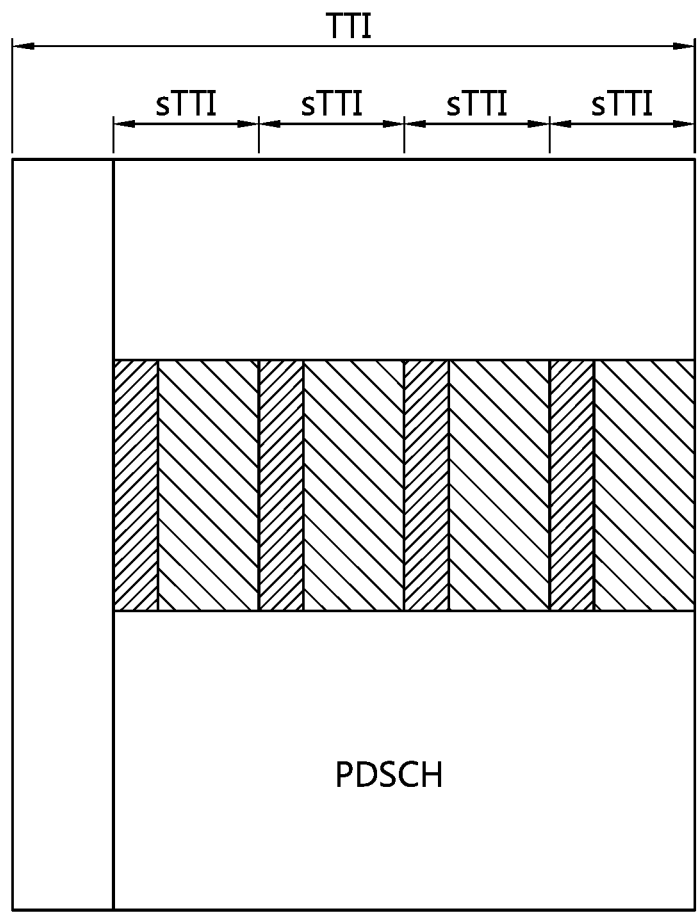
FIG. 8 shows an example of arranging a sPDCCH and a sPDSCH in a TDM manner.
Figure 9:
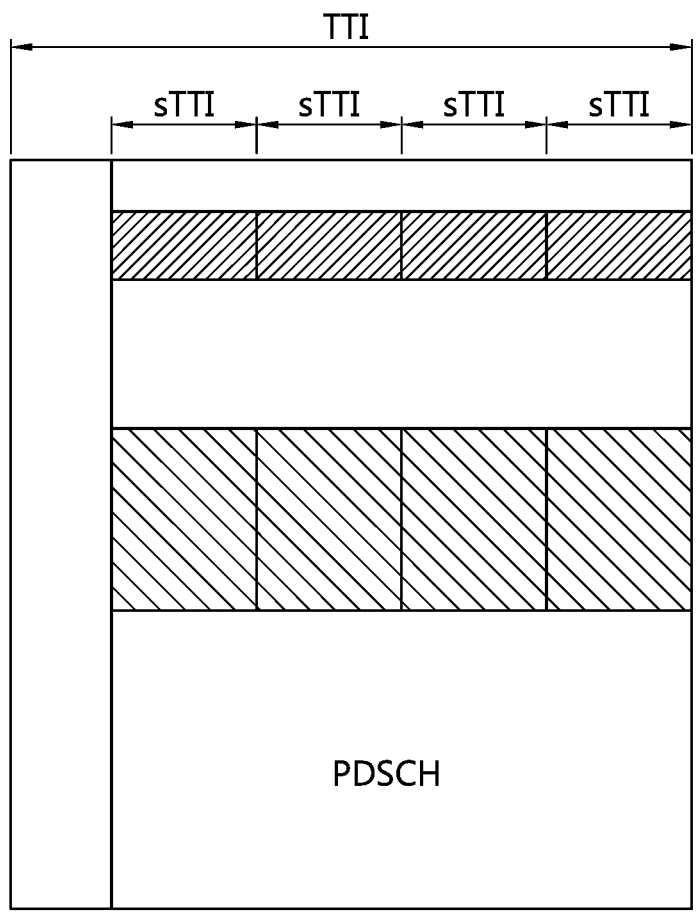
FIG. 9 shows an example of arranging a sPDCCH and a sPDSCH in an FDM manner.

A scheme of arranging a short PDCCH (sPDCCH) as a control channel and a short PDSCH (sPDSCH) as a data channel in a sTTI may be classified into a time division multiplexing (TDM) scheme and a frequency division multiplexing (FDM) scheme as shown in FIG. 8 and FIG. 9.

FIG. 8 shows an example of arranging a sPDCCH and a sPDSCH in a TDM manner.

When the TDM system is applied, since a control signal is arranged on a first OFDM symbol of the sTTI, the sPDCCH can be decoded while receiving the sPDSCH. Therefore, there is an advantage in that a user plane latency of 1 ms can be easily achieved. However, when a control region in which a control signal is transmitted is limited to the first OFDM symbol, there is a problem in that the number of RBs to be used to transmit the control signal is increased. If the sTTI has a length of 3 OFDM symbols as shown in FIG. 7, the number of RBs to be allocated is about 3 times higher than a case of transmitting the control signal by using all of the 3 OFDM symbols. The total number of RBs to which the sTTI is applied is not significantly different in TDM-based control signal transmission and FDM-based control signal transmission. This is because the sPDSCH is also used simultaneously with the sPDCCH in downlink transmission. However, when an uplink control signal is transmitted without having to transmit downlink data to a specific UE, the TDM scheme may have a disadvantage in that more RBs are allocated to transmit the control signal in comparison with the FDM scheme.

FIG. 9 shows an example of arranging a sPDCCH and a sPDSCH in an FDM manner.

Unlike in the TDM scheme, the FDM scheme may arrange the sPDCCH to all symbols of a sTTI. That is, for a specific RB, the sPDCCH may be arranged or the sPDSCH may be arranged. In doing so, the FDM-based arrangement has an advantage in that less RBs may be allocated for the sPDCCH in comparison with the TDM scheme. However, it may be difficult to decode the sPDCCH while receiving the sPDSCH. That is, disadvantageously, it is difficult to achieve a user plane latency of 1 ms if a decoding speed is not improved.

Therefore, the present specification describes a method of implementing a control signal arrangement based on an FDM scheme, and describes a method of minimizing a time delay caused by control signal decoding which is a disadvantage of the FDM scheme.

Terminologies are summarized for clarity of explanations. A subframe may be transmitted in unit of a transmission time interval (TTI), and a resource block may be transmitted in unit of a short TTI (sTTI) which is set to be temporally shorter than the TTI. Therefore, the resource block may be a short RB (sRB), and a resource element group may be a short REG (sREG). The resource element group includes a plurality of resource elements. A data channel includes a short PDSCH (sPDSCH), and a control channel includes a short PDCCH (sPDCCH) for the sPDSCH. Therefore, a plurality of control channels and data channels transmitted in unit of the sTTI are present in the subframe transmitted in unit of the TTI. A symbol includes an OFDM symbol.

First, a method of configuring a resource for sPDCCH transmission as a control channel element (CCE) is described. The method of configuring the CCE may be classified into a method of arranging REs constituting the CCE in an RB in a distributed manner to maximize diversity and a method of arranging the REs constituting the CCE to minimize a time delay. Next, a method of allocating a resource for sPDCCH transmission in an FDM manner through L2/L3 signaling is described. Herein, the sPDCCH is transmitted in a resource for sPDCCH transmission designated through the L2/L3 signaling. If it is determined that there is no sPDCCH during the sTTI, it is assumed that the resource for sPDCCH transmission may be utilized for data transmission or enhanced PDCCH (ePDCCH) transmission or the like of the existing UE.

Hereinafter, a method of arranging a short resource element group (sREG) for configuring a short CCE (sCCE) is described.

The sCCE is a resource allocation unit for sPDCCH transmission. The method proposed in the present specification is for configuring the sCCE so that the sREG can be arranged to maximize time and frequency diversity or the sREG can be arranged to minimize a disadvantage of the FDM scheme, that is, an increase in a decoding time of the sPDCCH. Although only the sTTI structure having 3 OFDM symbols and 2 OFDM symbols is described herein, the proposed method is also applicable to a sTTI having a different length.

It is assumed that the sCCE consists of the sREG similarly to the existing LTE system, and the sREG consists of REs. The sREG consists of REs in a single sRB. In addition, the sCCE may consist of sREGs of different RBs. The sCCE proposed in the present specification is designed as follows.

- The REs constituting the sCCE are arranged in a distributed manner to obtain the time and frequency diversity.
- When indexing the REs constituting the sCCE, an RE on which a cell specific reference signal (CRS) and a demodulation-reference signal (DM-RS) are arranged is also included. In case of using the CRS, it is assumed that the DM-RS is not used in sTTI transmission due to an overhead. In case of not using the CRS, it is assumed that the DM-RS is used. It is assumed that space frequency block coding (SFBC) is applied in unit of the sREG when the CRS is transmitted.
- The number of REs to be punctured due to the CRS in a specific sREG is minimized. This is to avoid a case where REs to be punctured due to the CRS are concentrated only in the specific sCCE since a control signal may not be transmitted in the RE on which the CRS is transmitted.

The REs constituting the sCCE are allowed to be constituted of the same OFDM symbol. This is to allow the sCCE to be constituted of only a first OFDM symbol when a low-latency requirement is necessarily satisfied.

Hereinafter, a sREG arrangement method in a sTTI structure to which a CRS is applied is described.

When the sTTI is applied in the existing band, the CRS must be used even in sTTI transmission. In this case, an embodiment of using the CRS may be represented as shown in FIG. 10 and FIG. 11.

Figure 10:
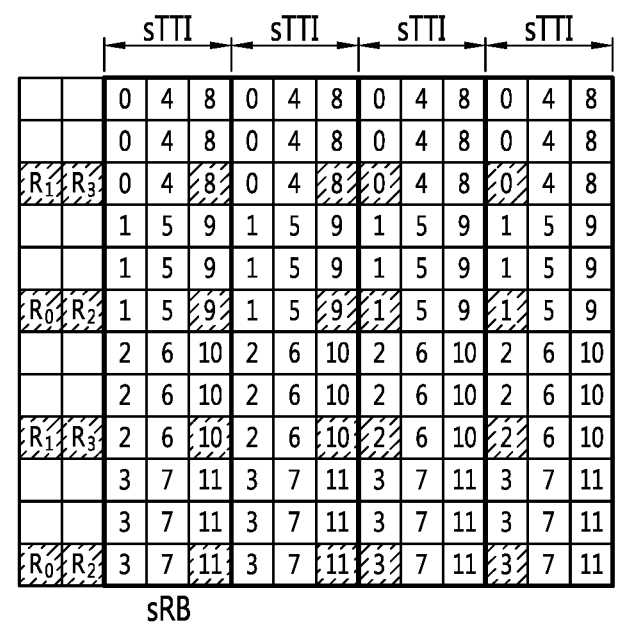

FIG. 10 shows an example of a sREG arrangement in a sTTI structure having 3 OFDM symbols. FIG. 11 shows an example of a sREG arrangement in a sTTI structure having 2 OFDM symbols.

Figure 11:
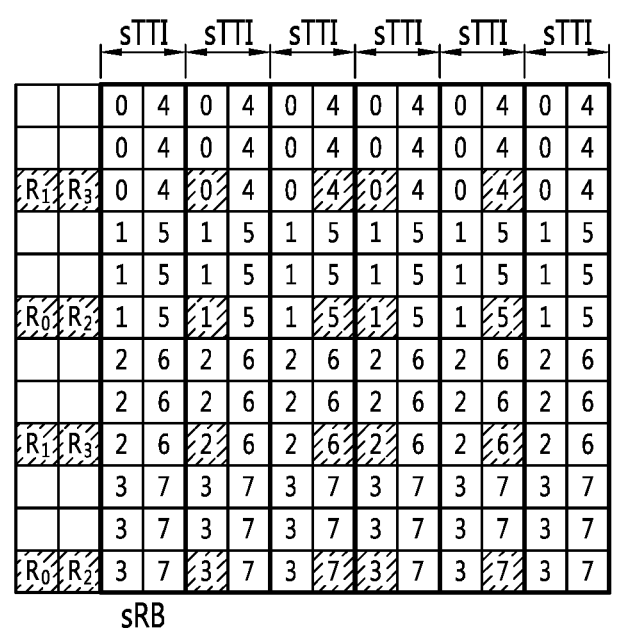

In FIG. 10 and FIG. 11, a sRB is indicated by a bold square, and an index of a sREG is indicated by a numeric number written in each RE. Herein, although a location of an RE on which a CRS is transmitted is indicated when four antenna ports are used, a case of using two antenna ports may also be included. In addition, the RE in the sREG is contiguously arranged on the same symbol.

In FIG. 10 and FIG. 11, each sREG consists of 3 REs. This is to limit the number of REs capable of transmitting the CRS and included in each sREG to up to 1. If each sREG consists of 4 REs, since two CRSs may be included in one sREG, resource efficiency deteriorates. In addition, this is to make it easier to apply SFBC even when some of the sREGs are punctured due to the CRS. For example, if the SFBC is applied to sREG 0 and sREG 2, since the RE in the same location is punctured, the SFBC can be easily applied.

In FIG. 10, the sRB consists of 36 REs in total, and a location of an RE capable of transmitting a signal is changed due to the CRS according to the sRB. If the CRS is transmitted through two antenna ports, the number of REs in the sRB capable of transmitting the signal is up to 36 and at least 32. If the CRS is transmitted through four antenna ports, all sRBs can transmit the signal by using 32 REs.

In FIG. 11, the sRB consists of 24 REs in total, and there are a sRB capable of transmitting a signal by using up to 24 REs and a sRB capable of transmitting a signal by using at least 20 REs.

The number of OFDM symbols in the sRB is denoted by $N_{sym}$, and the number of subcarriers is denoted by $N_{sc}$. In addition, an index of a sREG to which a $(k+1)^{th}$ symbol and a $(l+1)^{th}$ RE belong in the sRB is denoted by $I_{k,l}$. Herein, k is one of $0, 1, \ldots, N_{sym}$. A leftmost (first) OFDM symbol in the sRB is 0, and a rightmost (last) OFDM symbol is $N_{sym}$. In addition, l is one of $0, 1, \ldots, N_{sc}$. An uppermost subcarrier in the sRB is 0, and a lowermost subcarrier is $N_{sc}$. The method of arranging the sREG of FIG. 10 and FIG. 11 may be generalized as follows.

$$I_{k,l} = \left\lceil \frac{N_{SC}}{3} \right\rceil k + \left\lfloor \frac{l}{3} \right\rfloor \quad \text{[Equation 1]}$$

Hereinafter, a sREG arrangement method in a sTTI structure to which a DM-RS is applied is described.

If a sTTI is applied in a new frequency band or if the existing communication system is used as a primary carrier and a low-latency service system is used as a secondary carrier, sTTI transmission may be performed by using only the DM-RS without a CRS. Since SFBC may not be used in the DM-RS, the sREG may be arranged on the same symbol as the sRB in a distributed manner to obtain a frequency diversity gain. In addition, the number $N_{sREG}$ of REs in the sREG may be set differently according to the number of DM-RSs arranged in the sRB. In this case, an example of arranging the sREG may be represented as shown in FIG. 12 and FIG. 13.

FIG. 12 shows an example of arranging a sREG in a sTTI structure to which a DM-RS is applied and which has 3 OFDM symbols. FIG. 13 shows an example of arranging a sREG in a sTTI structure to which a DM-RS is applied and which has 2 OFDM symbols.

If the sTTI is applied in the existing band in FIG. 12 and FIG. 13, a CRS must be used even in sTTI transmission. Although it is not shown in FIG. 12 and FIG. 13 that the CRS is arranged in the sTTI, the CRS may be arranged also in a sRB to which the sTTI is applied as shown in FIG. 10 and FIG. 11. Likewise, the number of REs to be punctured due to the CRS in a specific sREG is minimized to avoid a case where REs to be punctured due to the CRS are concentrated only in a specific sCCE.

The number of OFDM symbols in the sRB is denoted by $N_{sym}$, and the number of subcarriers is denoted by $N_{sc}$. In addition, an index of a sREG to which a $(k+1)^{th}$ symbol and a $(l+1)^{th}$ RE belong in the sRB is denoted by $I_{k,l}$. Herein, k is one of $0, 1, \ldots, N_{sym}$. A leftmost (first) OFDM symbol in the sRB is 0, and a rightmost (last) OFDM symbol is $N_{sym}$. In addition, l is one of $0, 1, \ldots, N_{sc}$. An uppermost subcarrier in the sRB is 0, and a lowermost subcarrier is $N_{sc}$. The method of arranging the sREG of FIG. 12 and FIG. 13 may be generalized as follows.

$$I_{k,l} = \left\lceil \frac{N_{SC}}{N_{sREG}} \right\rceil k + \text{mod}\left(l, \left\lceil \frac{N_{SC}}{N_{sREG}} \right\rceil\right) \quad \text{[Equation 2]}$$

In addition, if a processing time for performing decoding is sufficiently short, the sREG constituting the sCCE may be arranged uniformly in the entirety of the sRB in a distributed manner. This may be expressed by the following equation.

$$I_{k,l} = \text{mod}\left(N_{SC}k + l, \left\lceil \frac{N_{SC}N_{sym}}{N_{sREG}} \right\rceil\right) \quad \text{[Equation 3]}$$

Hereinafter, a method of configuring a short control channel element (sCCE) by using a sREG is described.

The method of configuring the sCCE by using the sREG may be classified into a method for maximizing diversity and a method for minimizing a delay time.

The method of configuring the sCCE to maximize the diversity may be classified into a localized transmission in which a sREG constituting the sCCE consists of a sREG of a neighboring sRB and a distributed transmission in which the sREG constituting the sCCE consists of a sREG of a distributed sRB. However, if a DM-RS is not used due to an overhead in the sTTI, the localized transmission has an advantage in that the number of RBs to be allocated for a control signal may be small when the number of low-latency UE is small. In a situation where several RBs must be allocated for a sPDCCH since several low-latency UEs are present, the distributed transmission is preferably performed. Therefore, the sCCE is preferably configured such that the distributed transmission is possible unless the sPDCCH is transmitted by using a single sRB. In particular, in case of a sTTI having 2 OFDM symbols, it may be difficult to transmit the sPDCCH by using only the single sRB, and in this case, the distributed transmission is preferably performed by default. Therefore, when configuring a search space of the sPDCCH, if a resource capable of transmitting the sPDCCH is not the single sRB, a case where the sCCE consists of the sREG of the single sRB is excluded. However, this does not mean that the case where the resource capable of transmitting the sPDCCH is the single sRB is excluded. Thus, the sPDCCH may be transmitted by using only the single sRB, and the sPDCCH may be transmitted by using a plurality of sRBs.

The method of minimizing the delay time is for configuring a sCCE by using only a sREG of the same OFDM symbol. Therefore, if the number of REs in the sCCE of a system is $L_{sCCE}$, at least $L_{sCCE}/12$ sRBs are required. If the sCCE consists of 36 REs as in the LTE system, at least 3 sRBs are required.

When the method is applied, a sREG mapping rule of a sCCE is shared between a UE and a BS. However, the BS does not have to explicitly report at which OFDM symbol the control signal is transmitted to the UE. However, the BS may randomly arrange a DL grant, a UL grant, a retransmission DL grant, and a retransmission UL grant to minimize a delay time. For example, the BS may preferentially transmit the DL grant in a sCCE resource located in a first OFDM symbol, and may preferentially transmit the UL grant in a sCCE resource located in a last OFDM symbol. In addition, the retransmission DL grant is transmitted in an OFDM symbol located after the DL grant, and the retransmission UL grant is transmitted in an OFDM symbol located after the UL grant. This is because a delay effect is small due to an increase in a decoding time of the sPDCCH since a retransmission time is obtained by multiplying a retransmission probability by a round trip time (RTT) when calculating a user plane latency. In addition, this is because the decoding time of the sPDCCH occupies a small portion since the RTT is great. Therefore, an embodiment of arranging a control signal by the BS is as follows.

TABLE 1

| | Order of arranging signals preferentially to sCCE resource located in preceding OFDM symbol |
|---|---|
| Embodiment 1 | DL grant, retransmission DL grant, UL grant, retransmission UL grant |
| Embodiment 2 | DL grant, UL grant, retransmission DL grant, retransmission UL grant |

In addition, if a low-latency requirement is different for each UE, a control signal may be transmitted in a sCCE located in a more preceding OFDM symbol to a UE having a stricter low-latency requirement.

An example of configuring the sREG of the sCCE shared by the BS and the UE is as follows when the BS transmits the control signal as described above. It is assumed that the number of candidate sRBs capable of receiving the sPDCCH is $M_{sRB}$, the number of sREGs in the sCCE for transmitting the sPDCCH is $M_{sREG}$, and a sREG index set constituting an $(l+1)^{th}$ sCCE located in a $(k+1)^{th}$ symbol in the sRB is $I_{k,l}$ ($k=0, 1, \ldots, l=0, 1, \ldots,$). In addition, a sREG n of a $(m+1)^{th}$ sRB is (m,n) (m=0, 1, . . . , $M_{sRB}-1$). In this case, an embodiment of a method of mapping a sREG depending on the number of candidate sRBs to the sCCE is as follows.

TABLE 2

| $M_{sRB}$ | The number of sCCEs in $M_{sRB}$ | $I_{k,l}$ |
|---|---|---|
| $\left\lfloor \dfrac{3M_{sREG}}{N_{sc}} \right\rfloor$ | 1 | $I_{k,0} = \{(m, 4k + j) \mid m = 0,1, \ldots, M_{sRB} - 1 \text{ and } j = 0,1,2,3\}$ |
| $\left\lfloor \dfrac{6M_{sREG}}{N_{sc}} \right\rfloor$ | 2 | $I_{k,0} = \{(m, 4k + j) \mid m = 0,1, \ldots, M_{sRB} - 1 \text{ and } j = 0,2\}$ <br> $I_{k,1} = \{(m, 4k + j) \mid m = 0,1, \ldots, M_{sRB} - 1 \text{ and } j = 1,3\}$ |
| $\left\lfloor \dfrac{9M_{sREG}}{N_{sc}} \right\rfloor$ | 3 | $I_{k,0} = \{(m, 4k) \mid m = 0,1, \ldots, M_{sRB} - 1\} \cup \{(m, 4k + 3) \mid \mod(m, 3) = 0\}$, $I_{k,1} = \{(m, 4k + 1) \mid m = 0,1, \ldots, M_{sRB} - 1\} \cup \{(m, 4k + 3) \mid \mod(m, 3) = 1\}$ <br> $I_{k,2} = \{(m, 4k + 2) \mid m = 0,1, \ldots, M_{sRB} - 1\} \cup \{(m, 4k + 3) \mid \mod(m, 3) = 2\}$ |
| $\left\lfloor \dfrac{12M_{sREG}}{N_{sc}} \right\rfloor$ | 4 | $I_{k,0} = \{(m, 4k) \mid m = 0,1, \ldots, M_{sRB} - 1\}$, <br> $I_{k,1} = \{(m, 4k + 1) \mid m = 0,1, \ldots, M_{sRB} - 1\}$, <br> $I_{k,2} = \{(m, 4k + 2) \mid m = 0,1, \ldots, M_{sRB} - 1\}$, <br> $I_{k,3} = \{(m, 4k + 3) \mid m = 0,1, \ldots, M_{sRB} - 1\}$, |

Referring to Table 2, if the number of sCCEs in $M_{sRB}$ is 1 and the number of sRBs is 1 (m=0), a sREG index set constituting a first sCCE located in a first OFDM symbol in a sRB is $I_{0,0}$. $I_{0,0}=\{(0,0),(0,1),(0,2),(0,3)\}$, and sREGs having sREG indices 0, 1, 2, 3 are mapped to the first sCCE. In addition, a sREG set constituting a second sCCE located in a second OFDM symbol in the sRB is $I_{1,0}$. $I_{1,0}=\{(0,4),(0,5),(0,6),(0,7)\}$, and sREGs having sREG indices 4, 5, 6, 7 are mapped to the second sCCE.

If the number of sCCEs in $M_{sRB}$ is 2 and the number of sRBs is 2 (m=1), the sREG index set constituting the first sCCE located in the first OFDM symbol in the sRB is $I_{0,0}$, and the sREG index set constituting the second sCCE located in the first OFDM symbol in the sRB is $I_{0,1}$. $I_{0,0}=\{(0,0),(0,2),(1,0),(1,2)\}$, and sREGs having sREG indices 0, 2 for two sRBs are mapped to the first sCCE. $I_{0,1}=\{(0,1),(0,3),(1,1),(1,3)\}$, and sREGs having sREG indices 1, 2 for two sRBs are mapped to the second sCCE.

Likewise, in a case where the number of sCCEs in $M_{sRB}$ is 3 and a case where the number of sCCEs in $M_{sRB}$ is 4, how to map the sREG to the sCCE may be obtained as described above with reference to Table 2.

Hereinafter, a method of aggregating a sCCE for sPDCCH transmission is described.

When a sCCE for sPDCCH transmission needs to be aggregated, a BS may aggregate a sCCE of a preceding OFDM symbol and a sCCE of a following OFDM symbol. For example, when using $I_{k,l}$ of Table 2, the aggregation is performed on the same k, and when a sCCE resource is additionally required, the aggregation may be performed in an ascending order of the value 1.

Figure 14:
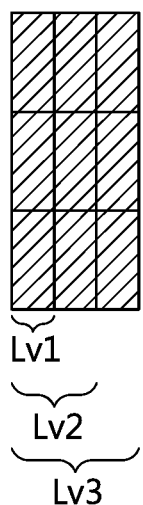
FIG. 14 to FIG. 16 show an embodiment of performing a sCCE aggregation according to the number of sRBs capable of transmitting a sPDCCH.
Figure 15:
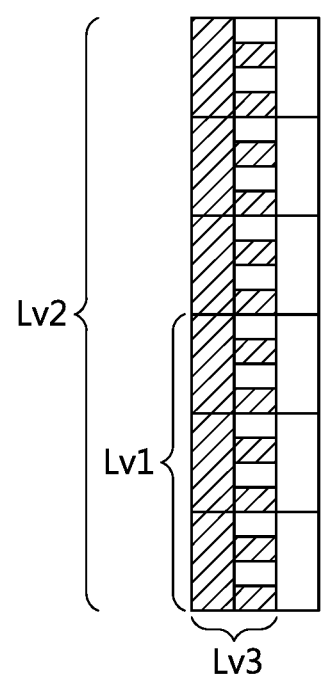
Figure 16:
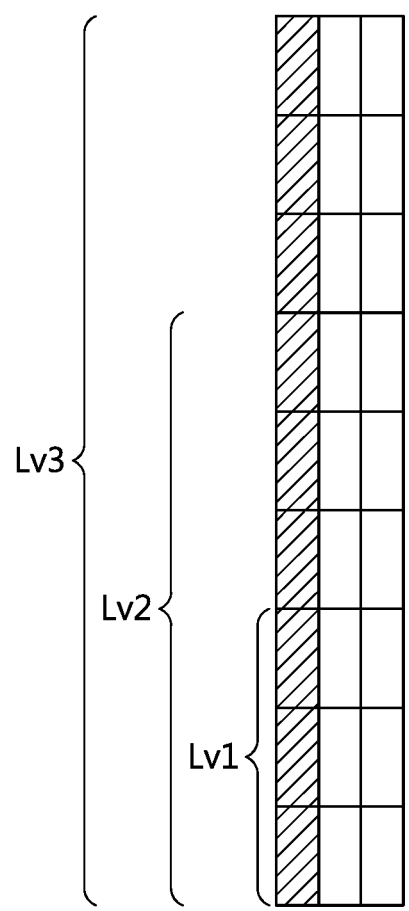

FIG. 14 to FIG. 16 show an embodiment of performing a sCCE aggregation according to the number of sRBs capable of transmitting a sPDCCH.

FIG. 14 shows an embodiment in which the number of sRBs capable of transmitting the sPDCCH in the same sTTI is 3. FIG. 15 shows an embodiment in which the number of sRBs capable of transmitting the sPDCCH in the same sTTI is 6. FIG. 16 shows an embodiment in which the number of sRBs capable of transmitting the sPDCCH in the same sTTI is 9.

Since the sCCE cannot be additionally allocated in a frequency axis in FIG. 14, a sCCE of a following OFDM symbol is aggregated (Lv2, Lv3). Since the sCCE cannot be additionally allocated in a frequency axis in FIG. 15, the sCCE in the frequency axis (Lv2) is aggregated first. In addition, if the sCCE cannot be additionally allocated in the frequency axis any more, the sCCE of the following OFDM symbol is aggregated (Lv3). In this case, a sREG of a sCCE of a second OFDM symbol may be transmitted across 6 sRBs. FIG. 16 shows a case where the sCCE is aggregated only in the frequency axis since there is sufficient sCCEs in the frequency axis (Lv2, Lv3). That is, the sCCE is aggregated on the same OFDM symbol if possible.

FIG. 17 to FIG. 28 show an embodiment of performing a sCCE aggregation in a sTTI structure having 3 OFDM symbols.

In case of FIG. 16, there may be a case where the sCCE is aggregated both in frequency and time axes. In this case, there is a need to limit a range of performing the aggregation to decrease the number of blind decoding attempts of a UE. In general, an aggregation level of the sCCE is preferably set to a binary multiple such as 1, 2, 4, 8, etc., in terms of resource utilization. An embodiment in the sTTI structure having the 3 OFDM symbols may be classified into 4 types as follows.

Figure 17:
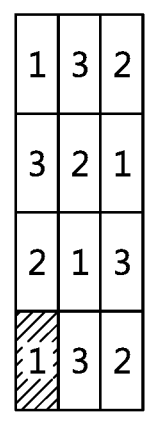
Figure 18:
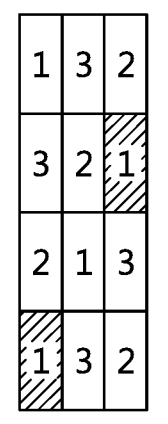
Figure 19:

First, FIG. 17 to FIG. 19 show an embodiment of a method of arranging a sCCE resource aggregated across the entire time and frequency resources to obtain time and frequency diversity gains to the maximum extent possible.

Figure 20:
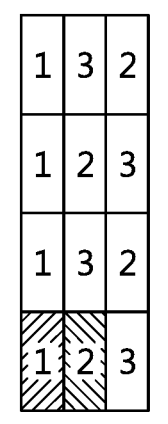
Figure 21:
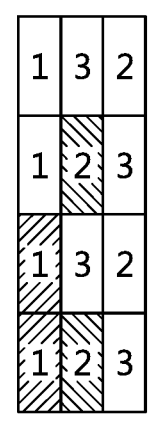
Figure 22:
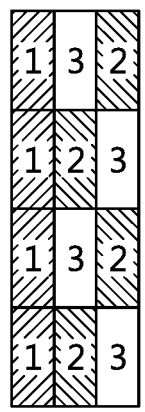

Second, FIG. 20 to FIG. 22 show an embodiment of a method of performing an aggregation on a first OFDM symbol only in a time axis and arranging a sCCE resource in a distributed manner only in second and third OFDM symbols.

Figure 23:
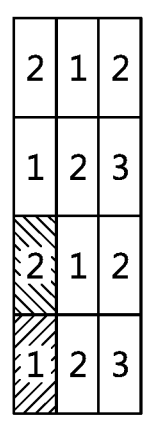
Figure 24:
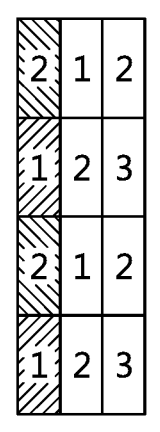
Figure 25:
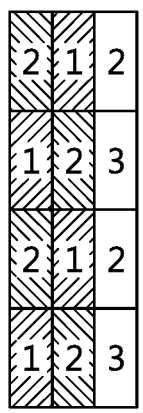

Third, FIG. 23 to FIG. 25 show an embodiment of a method of aggregating a sCCE resource across two preceding OFDM symbols.

Figure 26:
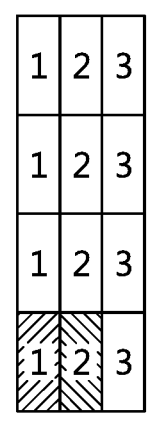
Figure 27:
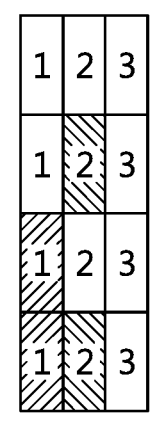
Figure 28:
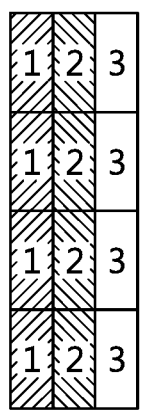

Fourth, FIG. 26 to FIG. 28 show an embodiment of a method of aggregating a sCCE resource only in each OFDM symbol unit.

In FIG. 17 to FIG. 28, sCCE resources having the same numeric number imply sCCE resources that can be mutually aggregated. For each UE, a sCCE resource capable of receiving a signal in advance may be explicitly instructed through a radio resource control (RRC), or may be mapped according to a UE ID, a cell ID, a cell-radio network temporary identifier (C-RNTI), or the like. In addition, a candidate of one or more sCCE resources to be aggregated may be allocated to the UE. For example, any UE may be instructed to consider all sCCE resources corresponding to sCCEs 1 and 2 of FIG. 17 to FIG. 28 as a region to which blind decoding for decoding a control signal is applied. In FIG. 17 to FIG. 28, a sCCE resource to be used by any UE to perform blind decoding is indicated by a shadow when an aggregation level of a sCCE is 1, 2, 4.

In FIG. 17 to FIG. 19, a region in which a sCCE is aggregated is designated so that time and frequency gains are maximized when a decoding time of a sPDCCH is sufficient, that is, when a decoding speed of the sPDCCH is fast enough. That is, FIG. 17 shows that the sCCE 1 resource is aggregated according to an aggregation level 1. FIG. 18 shows that the sCCE 1 resource is aggregated according to an aggregation level 2. FIG. 19 shows that the sCCE 1 resource is aggregated according to an aggregation level 4.

FIG. 20 to FIG. 22 show a case where a region is designated such that a PDCCH transmitted on a first OFDM symbol is aggregated only on the first OFDM symbol to minimize a buffering time of a sPDCCH. That is, FIG. 20 shows a case where each of a sCCE 1 resource and a sCCE 2 resource is aggregated according to an aggregation level 1. FIG. 21 shows a case where each of a sCCE 1 resource and a sCCE 2 resource is aggregated according to an aggregation level 2. Herein, the sCCE 2 resource obtains a frequency diversity gain. FIG. 22 shows a case where each of a sCCE 1 resource and a sCCE 2 resource is aggregated according to an aggregation level 4. Herein, the sCCE 2 resource obtains time and frequency diversity gains.

FIG. 23 to FIG. 25 show a case where a region is designated such that an aggregation is performed on first and second OFDM symbols when a buffering time of a sPDCCH allows up to two OFDM symbols. That is, FIG. 23 shows that each of a sCCE 1 resource and a sCCE 2 resource is aggregated according to an aggregation level 1. FIG. 24 shows that each of a sCCE 1 resource and a sCCE 2 resource is aggregated according to an aggregation level 1. Herein, the sCCE 1 resource and the sCCE 2 resource obtain a frequency diversity gain. FIG. 22 shows that each of a sCCE 1 resource and a sCCE 2 resource is aggregated according to an aggregation level 4. Herein, the sCCE 1 resource and the sCCE 2 resource obtain time and frequency diversity gains.

FIG. 26 to FIG. 28 show a case where a region is designated such that a sCCE is aggregated only on the same OFDM symbol. That is, FIG. 26 shows that each of a sCCE 1 resource and a sCCE 2 resource is aggregated according to an aggregation level 1. FIG. 27 shows a case where each of a sCCE 1 resource and a sCCE 2 resource is aggregated according to an aggregation level 2. Herein, the sCCE 2 resource obtains a frequency diversity gain. FIG. 28 shows a case where each of a sCCE 1 resource and a sCCE 2 resource is aggregated according to an aggregation level 4.

Next, a method of allocating a resource for sPDCCH transmission in an FDM manner through L2/L3 signaling is described.

Candidate sRBs capable of performing sPDCCH transmission may be defined for each UE through L2/L3 signaling. More specifically, a sCCE capable of performing sPDCCH transmission is defined, and sRBs capable of transmitting the sCCE are candidate sRBs capable of transmitting sPDCCH transmission.

In a case where a low-latency UE is subjected to in-band multiplexing together with the existing UE, when a sPDCCH is transmitted through a specific sRB to the low-latency UE, an RB including the specific sRB cannot be allocated to the existing UE during a TTI. Therefore, when N sRBs are present in two RBs to which the TTI is applied, a resource must be allocated such that sPDCCH transmission is possible in unit of N sRBs. Unlike this, in a case where a signal is transmitted or received by applying a sTTI in a dedicated carrier, a candidate capable of performing sPDCCH transmission may be designated on the basis of a short RB (sRB) newly defined for the sTTI.

It is assumed in the present specification that the existing system performs communication in unit of a TTI, and N sTTIs are present in total in the TTI. The existing UE is scheduled in unit of the TTI, and the low-latency UE is scheduled in unit of the sTTI. Therefore, even if a BS does not need to schedule the low-latency UE at a time of scheduling the existing UE in unit of the TTI, it is necessary to leave a resource for transmitting the traffic of the low-latency UE, which occurs within the TTI. Therefore, the BS needs to predict and schedule the traffic of the low-latency UEs, which will occur during the TTI while scheduling the UE.

The present specification first proposes a technique for allocating sPDCCH transmission resources to facilitate traffic prediction of a low-latency UE. This technique aims to increase resource efficiency by efficiently allocating TTI resources and sTTI resources. Subsequently, the present specification also proposes a technique for allocating sPDCCH transmission resources to satisfy low latency in a reliable manner even if there is a loss in resource efficiency in a situation where the low latency must be satisfied such as a mission critical service.

To being with, a scheme for allocating sPDCCH transmission resources is proposed to improve resource efficiency of a system by facilitating traffic prediction of a low-latency UE at a time when a BS schedules the existing UE. The proposed scheme is characterized as follows.

First, from a BS perspective, it is desirable that one or more UEs can receive a sPDCCH in a single sRB. When one UE can receive the sPDCCH in the single sRB, it is necessary to predict whether traffic of the UE is generated. This is more difficult than predicting a traffic average of a plurality of UEs. In addition, when only a single UE can receive the sPDCCH in a specific sRB, a corresponding resource is wasted if the sPDCCH is not transmitted to the UE. For example, the sPDCCH may be transmitted to the UE only in a first sTTI, and sPDCCH transmission may not be achieved in a subsequent sTTI. Therefore, it is preferably allowed to transmit the sPDCCH to a plurality of UEs in a specific sRB.

Second, from a UE perspective, it is desirable that the UE can receive a sPDCCH in one or more sRBs. This is because it may be difficult to transmit the sPDCCH to one UE when there are two or more low-latency UEs to which resources are allocated in the single sRB if the sPDCCH can be received only in the single sRB.

It can be seen from the first and second characteristics that it is effective to configure a common control channel if a service provided to each low-latency UEs has the same importance and has the same probability model of traffic generation. In this case, signaling for allocating a sPDCCH transmission region in an FDM manner may be delivered through a system information block (SIB) as common signaling for the low-latency UE. More specifically, it may be transmitted through an SIB2 or an SIB-X, and the SIB-X may be an SIB newly defined for low latency. The SIB2 or the SIB-X includes the following information.

(1) Location Information of sRB Capable of Transmitting sPDCCH

Information included when a bitmap scheme is applied: When the number of sRBs indicated by one bit of a bitmap is fixed, only bitmap information is transmitted. On the other hand, when the number of sRBs indicated by one bit of the bitmap is variable, an indicator and bitmap information indicating a size of a sRB group indicated by the bitmap are transmitted.

Information included when an RB arrangement scheme has a specific rule: A value indicating a start point and length of a logical index of a candidate sRB is transmitted.

(2) Size Information of Unit in which sPDCCH Schedules sPDSCH

Size information of a short RB group (sRBG) of a sPDSCH used when a sPDCCH performs scheduling is transmitted.

If a traffic probability model is different for each UE, a region in which the sPDCCH can be transmitted may be reported through signaling for each UE according to a characteristic of the UE. In this case, an example of a signal transmitted to each UE is as follows.

(1) Signal Transmitted Through SIB

Resource allocation unit of sPDCCH: Information indicating a size of a sRB for allocating a sPDCCH is transmitted when a resource unit for allocating a region in which the sPDCCH can be transmitted is changed.

Size information of unit in which sPDCCH schedules sPDSCH: Size information of a sRBG of a sPDSCH used when a sPDCCH performs scheduling is transmitted.

(2) Signal Delivered Through UE-Specific Signaling

Location information of an RB capable of transmitting sPDCCH of corresponding UE: When a bitmap scheme is applied, bitmap information is transmitted. When an RB arrangement scheme has a specific rule, a value indicating a start point and length of a logical index of a candidate sRB is transmitted. In this case, UE-specific signaling may be regarded as radio resource control (RRC) signaling.

The aforementioned methods still have a possibility of a failure in allocation or prediction of a resource in which the sPDCCH can be transmitted to facilitate low-latency traffic prediction. Therefore, there is a need for a technique for allocating a resource capable of transmitting the sPDCCH to transmit a low-latency signal having high importance. A method of transmitting a low-latency control signal having high importance has the following characteristic.

First, a sPDCCH transmission resource of the UE having high importance is always allowed to be secured in order to reliably transmit the sPDCCH of the UE having high importance. When a sRB capable of transmitting the sPDCCH is designated for each UE, the sRB is allocated such that the low-latency sRBs having high importance do not overlap with each other. Alternatively, in case of having a common sPDCCH control channel, sRB candidates capable of transmitting N sPDCCHs are secured when N low-latency UEs receive an importance service.

Second, a PDCCH resource of a UE having relatively low importance may overlap with respect to the UE having high importance. This is to increase resource efficiency, and when the sPDCCH of the UE having high importance and the sPDCCH of the UE having low importance are to be transmitted simultaneously, the sPDCCH of the UE having high importance is preferentially transmitted.

Third, the sRB capable of transmitting the sPDCCH of the low-latency UE having high importance may be limited to one type in order to minimize an overhead of blind decoding. In the aforementioned technique, it is considered that a BS can solve this problem by using scheduling.

Figure 29:
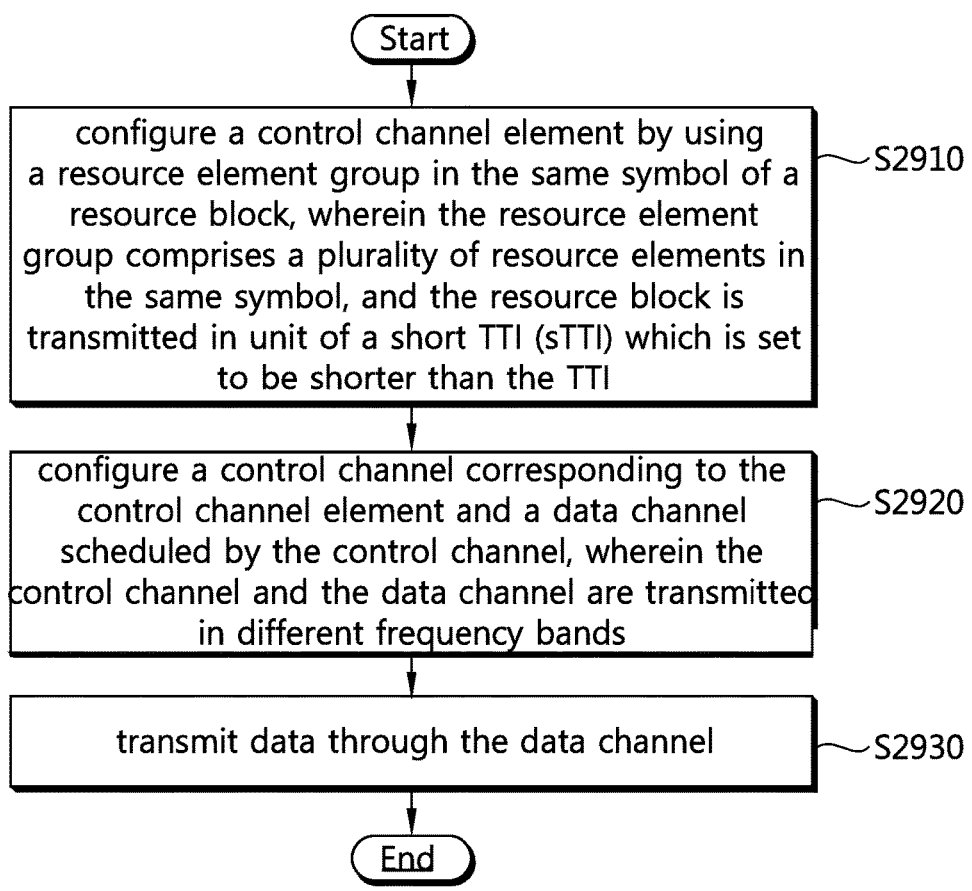
FIG. 29 is a flowchart showing a procedure for performing communication in a wireless communication system according to an embodiment of the present specification.

FIG. 29 is a flowchart showing a procedure for performing communication in a wireless communication system according to an embodiment of the present specification.

First, terminologies are summarized. A subframe may be transmitted in unit of a transmission time interval (TTI), and a resource block may be transmitted in unit of a short TTI (sTTI) which is set to be temporally shorter than the TTI. Therefore, the resource block may be a short RB (sRB), and a resource element group may be a short REG (sREG). The resource element group includes a plurality of resource elements. A data channel includes a short PDSCH (sPDSCH), and a control channel includes a short PDCCH (sPDCCH) for the sPDSCH. Therefore, a plurality of control channels and data channels transmitted in unit of the sTTI are present in the subframe transmitted in unit of the TTI. A symbol includes an OFDM symbol.

In step S2910, a control channel element is configured by using a resource element group in the same symbol of a resource block. That is, for sPDCCH transmission, the resource element group is mapped to the control channel element. One or a plurality of resource element groups may be used to configure the control channel element. Herein, the resource element group includes a resource element in the same symbol, and the control channel element is a short CCE (sCCE).

In step S2920, a control channel corresponding to the previously configured control channel element is configured, and a data channel scheduled by the control channel is configured. In this case, the control channel and the data channel are transmitted in different frequency bands. That is, a sPDCCH and a sPDSCH are allocated in an FDM manner during the sTTI.

In step S2930, data is transmitted through the data channel.

Figure 30:
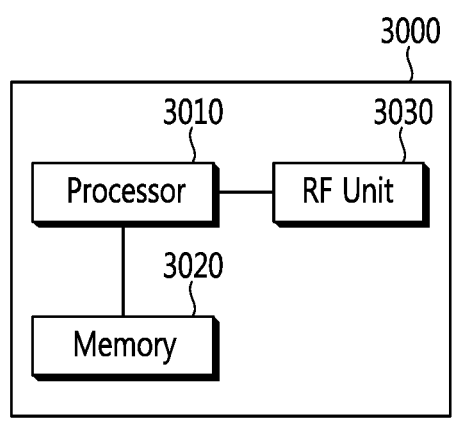
FIG. 30 is a block diagram showing an apparatus for wireless communication for implementing an embodiment of the present invention.

FIG. 30 is a block diagram showing an apparatus for wireless communication for implementing an embodiment of the present invention.

An apparatus 3000 for wireless communication includes a processor 3010, a memory 3020 and a radio frequency (RF) unit 3030.

The processor 3010 may be configured to implement proposed functions, procedures and/or methods described in this description. Layers of the radio interface protocol may be implemented in the processor 3010. The processor 3010 may handle a procedure explained above. The memory 3020 is operatively coupled with the processor 3010, and the RF unit 3030 is operatively coupled with the processor 3010.

The processor 3010 may include application-specific integrated circuit (ASIC), other chipset, logic circuit and/or data processing device. The memory 3020 may include read-only memory (ROM), random access memory (RAM), flash memory, memory card, storage medium and/or other storage device. The RF unit 3030 may include baseband circuitry to process radio frequency signals. When the embodiments are implemented in software, the techniques described herein can be implemented with modules (e.g., procedures, functions, and so on) that perform the functions described herein. The modules can be stored in memory 3020 and executed by processor 3010. The memory 3020 can be implemented within the processor 3010 or external to the processor 3010 in which case those can be communicatively coupled to the processor 3010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method of performing communication by using a plurality of control channels and data channels transmitted through a plurality of symbols, in a wireless communication system, using a subframe transmitted in a unit of a transmission time interval (TTI), the method comprising:

configuring a control channel element by using a resource element group in the same symbol of a resource block, wherein the resource element group comprises a plurality of resource elements in the same symbol, and wherein the resource block is transmitted in a unit of a short TTI (sTTI), which is set to be shorter than the TTI;

configuring a control channel corresponding to the control channel element and a data channel scheduled by the control channel, wherein the control channel and the data channel are transmitted in different frequency bands; and transmitting data through the data channel, wherein the same symbol is a first symbol, a second symbol is transmitted in the resource block after the first symbol, the control channel element is aggregated on the first symbol, and when a frequency band of a control channel corresponding to the control channel element aggregated on the first symbol is insufficient, the control channel element is additionally aggregated on the second symbol.

2. The method of claim 1,
wherein the data channel comprises a short physical downlink shared channel (sPDSCH), and
wherein the control channel comprises a short physical downlink control channel (sPDCCH) for the sPDSCH.

3. The method of claim 1, wherein a downlink grant and a retransmission downlink grant are transmitted through the control channel corresponding to the control channel element aggregated on the first symbol, and an uplink grant and a retransmission uplink grant are transmitted through the control channel corresponding to the control channel element aggregated on the second symbol.

4. The method of claim 1, wherein a downlink grant and an uplink grant are transmitted through the control channel corresponding to the control channel element aggregated on the first symbol, and a retransmission downlink grant and a retransmission uplink grant are transmitted through a control channel corresponding to the control channel element aggregated on the second symbol.

5. The method of claim 1, wherein allocation information of the control channel corresponding to the control channel element aggregated on the first symbol or the second symbol is transmitted through a system information block (SIB) or is transmitted individually through a radio resource control (RRC).

6. The method of claim 1, wherein a resource element in a resource element group of the resource block is consecutively arranged on the same symbol.

7. The method of claim 6, wherein a cell-specific reference signal (CRS) is arranged in the resource element group of the resource block to the minimum extent possible.

8. The method of claim 1, wherein a resource element in a resource element group of the resource block is arranged on the same symbol in a distributed manner.

9. The method of claim 8, wherein a demodulation-reference signal (DM-RS) is arranged in a resource element group of the resource block.

10. The method of claim 1, wherein the same symbol of the resource block is a first symbol of the resource block.

11. The method of claim 1, wherein when a plurality of resource blocks are transmitted during the sTTI, each resource block is transmitted in a frequency-distributed manner.

12. The method of claim 1, wherein the same symbol is an orthogonal frequency division multiplexing (OFDM) symbol.

13. A wireless device for performing communication by using a plurality of control channels and data channels transmitted through a plurality of symbols, in a wireless communication system, using a subframe transmitted in a unit of a transmission time interval (TTI), the wireless device comprising:
    a transmitter and receiver; and
    a processor, operatively coupled to the transmitter and receiver, wherein the processor:
    configures a control channel element by using a resource element group in the same symbol of a resource block,
        wherein the resource element group comprises a plurality of resource elements in the same symbol, and
        wherein the resource block is transmitted in a unit of a short TTI (sTTI), which is set to be shorter than the TTI;
    configures a control channel corresponding to the control channel element and a data channel scheduled by the control channel,
        wherein the control channel and the data channel are transmitted in different frequency bands; and
    controls the transmitter to transmit data through the data channel,
        wherein the same symbol is a first symbol, a second symbol is transmitted in the resource block after the first symbol, the control channel element is aggregated on the first symbol, and when a frequency band of a control channel corresponding to the control channel element aggregated on the first symbol is insufficient, the control channel element is additionally aggregated on the second symbol.

* * * * *